(12) United States Patent
Watts

(10) Patent No.: US 10,995,903 B1
(45) Date of Patent: May 4, 2021

(54) MOUNTING APPARATUS FOR SECURING A CAMERA TO A CRANE

(71) Applicant: Titus Gadwin Watts, San Francisco, CA (US)

(72) Inventor: Titus Gadwin Watts, San Francisco, CA (US)

( * ) Notice: Subject to any disclaimer, the term of this patent is extended or adjusted under 35 U.S.C. 154(b) by 95 days.

(21) Appl. No.: 16/656,909

(22) Filed: Oct. 18, 2019

Related U.S. Application Data

(60) Provisional application No. 62/747,433, filed on Oct. 18, 2018.

(51) Int. Cl.
| | | |
|---|---|---|
| *F16M 13/04* | (2006.01) | |
| *F16M 13/02* | (2006.01) | |
| *G03B 17/56* | (2021.01) | |
| *F16M 11/04* | (2006.01) | |

(52) U.S. Cl.
CPC ............ *F16M 13/02* (2013.01); *F16M 11/04* (2013.01); *F16M 11/048* (2013.01); *G03B 17/561* (2013.01)

(58) Field of Classification Search
USPC ........................................................ 396/419
See application file for complete search history.

(56) References Cited

U.S. PATENT DOCUMENTS

| | | | |
|---|---|---|---|
| 1,480,651 A | 1/1924 | Bailey | |
| 3,902,798 A * | 9/1975 | Trumbull | B66F 11/048 352/85 |
| 4,378,100 A * | 3/1983 | Minozzi | F16M 11/04 248/168 |
| 4,814,803 A | 3/1989 | Wisner | |
| 5,039,050 A * | 8/1991 | Eidschun | F16M 13/022 248/279.1 |
| 5,531,412 A * | 7/1996 | Ho | F16M 11/10 248/123.2 |
| 7,309,177 B2 * | 12/2007 | Chapman | B66F 11/048 396/419 |
| 8,596,892 B2 | 12/2013 | Murrow et al. | |
| 8,794,521 B2 * | 8/2014 | Joussen | G06K 7/1404 235/454 |
| 9,921,464 B1 * | 3/2018 | Choi | G03B 17/561 |

* cited by examiner

*Primary Examiner* — Clayton E. LaBalle
*Assistant Examiner* — Warren K Fenwick
(74) *Attorney, Agent, or Firm* — Plager Schack LLP; Mark H. Plager; Eric Liou

(57) ABSTRACT

A mounting apparatus for use to secure a camera to a crane is provided. The mounting apparatus includes a L-shaped bracket having a vertical plate designed to couple to the crane and a horizontal plate having an elongated slot, and a support assembly having a main plate disposed on the horizontal plate of the L-shaped bracket. The main plate of the support assembly has an elongated slot that aligns with the elongated slot in the horizontal plate of the L-shaped bracket. The main plate supports the camera thereon and the elongated slots in the horizontal plate of the L-shaped bracket and main plate of the support assembly are designed to receive a fastener that extends through the elongated slots to engage the camera.

10 Claims, 4 Drawing Sheets

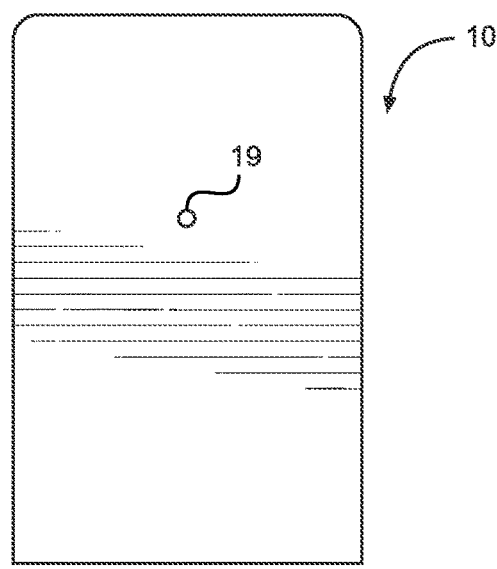
FIG. 5
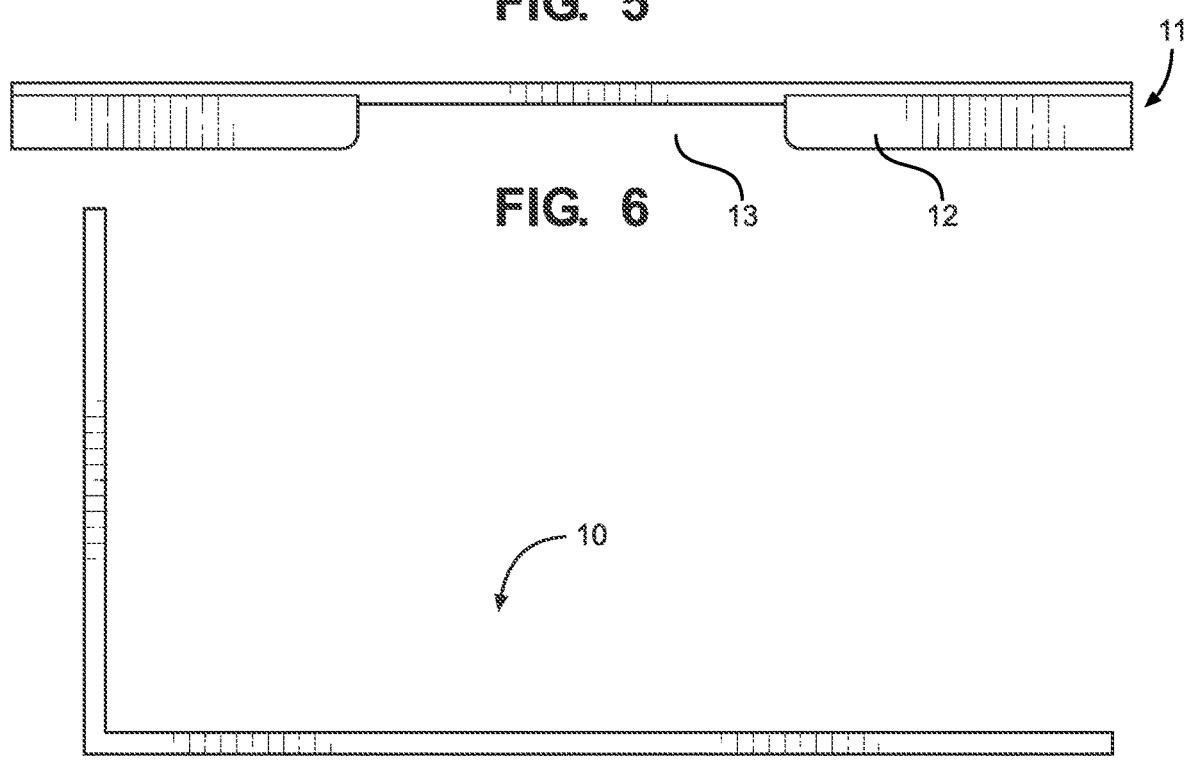
FIG. 6
FIG. 7
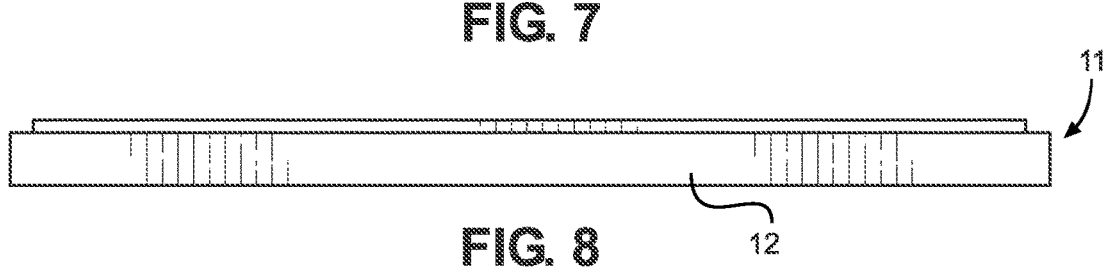
FIG. 8

MOUNTING APPARATUS FOR SECURING A CAMERA TO A CRANE

RELATED APPLICATION

The application claims priority to provisional patent application U.S. Ser. No. 62/747,433 filed on Oct. 18, 2018, the entire contents of which is herein incorporated by reference.

BACKGROUND

The embodiments herein relate generally to support assemblies for cameras. More specifically, embodiments of the invention are directed to a mounting apparatus for securing a camera to a crane.

Cameras used in the production of film or television works need to be properly mounted to capture the various scenes. These cameras are generally bulky and heavy, which require mounting devices that can provide a stable platform with a high load-bearing capacity.

Several support assemblies as disclosed in U.S. Pat. Nos. 8,596,892, 4,814,803 and 1,480,651 disclose various platforms for cameras. However, these support assemblies are undesirable because they comprise many parts and/or complex components such as gear trains, pinions, struts, linkage members and the like, which are subject to premature wear and/or increased maintenance costs.

As such, there is a need in the industry for a mounting apparatus that secures a camera to a crane that addresses the limitations of the prior art, which provides a stable platform to support the camera. There is a further need for the mounting apparatus to comprise simple components that do not require complex mechanisms and/or tools during use.

SUMMARY

In certain embodiments of the invention, a mounting apparatus for use to secure a camera to an end of a crane with enhanced load-bearing capacity and stability is provided. The mounting apparatus comprises a L-shaped bracket comprising a horizontal plate continuously connected to a vertical plate, the vertical plate configured to couple to the end of the crane, the horizontal plate comprising an elongated slot disposed therethrough, and a support assembly comprising a main plate disposed on the horizontal plate of the L-shaped bracket, the main plate of the support assembly comprising an elongated slot that aligns with the elongated slot in the horizontal plate of the L-shaped bracket, wherein the main plate is configured to support the camera thereon and the elongated slots in the horizontal plate of the L-shaped bracket and main plate of the support assembly are configured to receive a fastener that extends through the elongated slots to engage the camera, thereby securing the camera to the end of the crane.

BRIEF DESCRIPTION OF THE FIGURES

The detailed description of some embodiments of the invention will be made below with reference to the accompanying figures, wherein the figures disclose one or more embodiments of the present invention.

FIG. 5 depicts a rear view of certain embodiments of the mounting apparatus, illustrating the vertical plate of the L-shaped bracket;

FIG. 6 depicts a rear view of certain embodiments of the mounting apparatus, illustrating the support assembly;

FIG. 7 depicts a side view of certain embodiments of the mounting apparatus, illustrating the L-shaped bracket;

FIG. 8 depicts a front view of certain embodiments of the mounting apparatus, illustrating the support assembly;

DETAILED DESCRIPTION OF CERTAIN EMBODIMENTS

Figure 1:
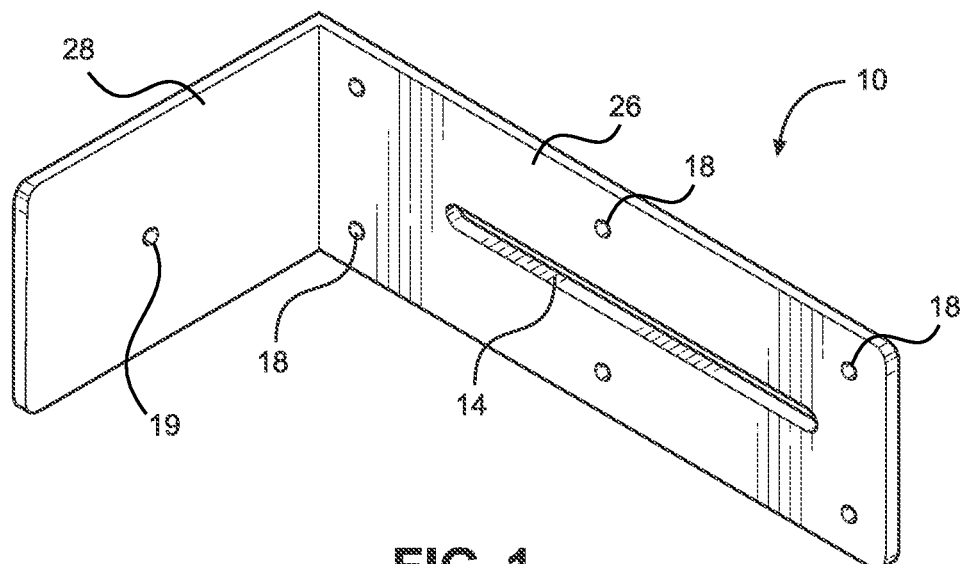
FIG. 1 depicts a perspective view of certain embodiments of the mounting apparatus, illustrating the L-shaped bracket.
Figure 2:
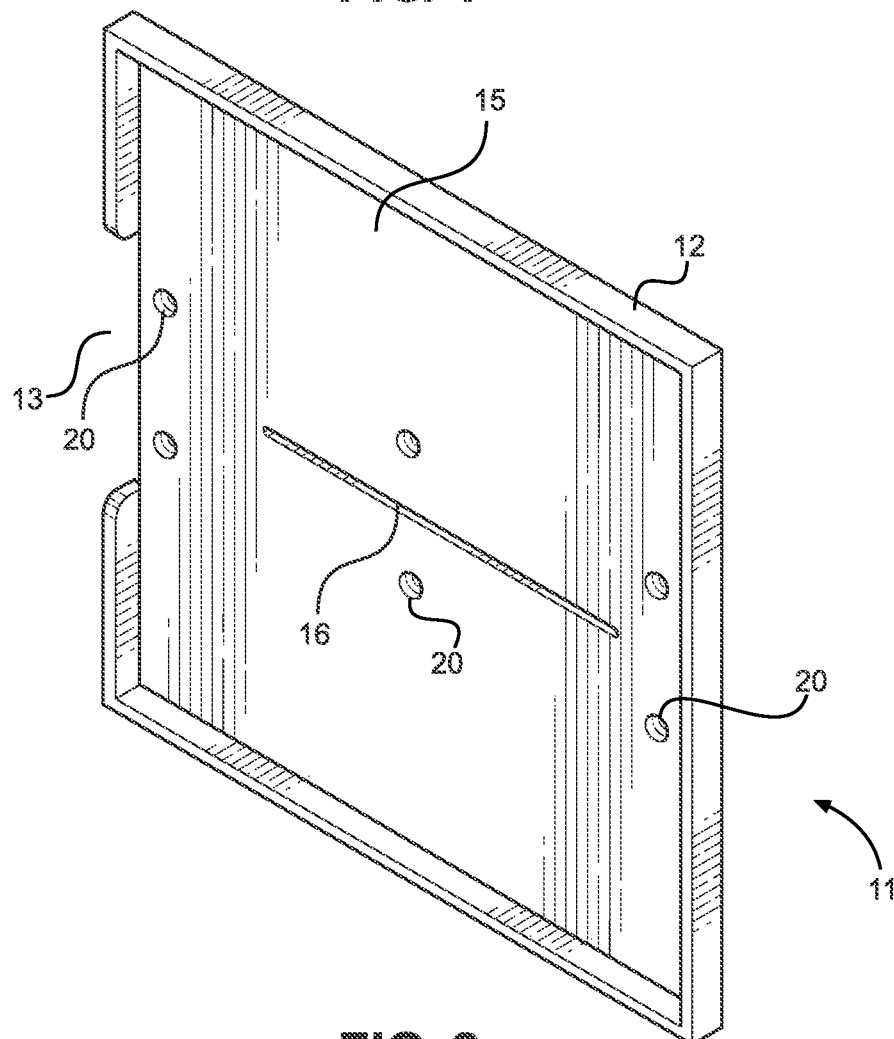
FIG. 2 depicts a perspective view of certain embodiments of the mounting apparatus, illustrating the support assembly.
Figure 3:
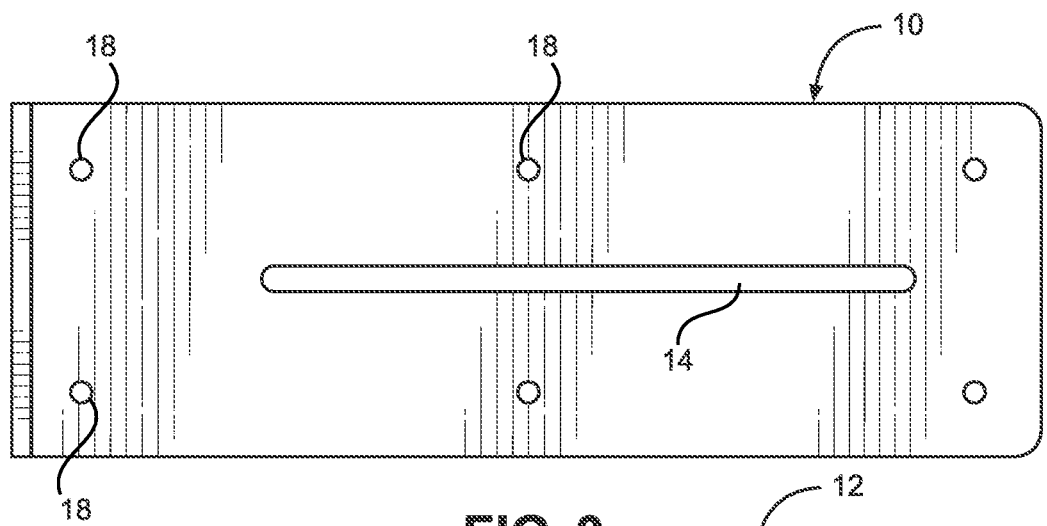
FIG. 3 depicts a top view of certain embodiments of the mounting apparatus, illustrating the L-shaped bracket.
Figure 4:
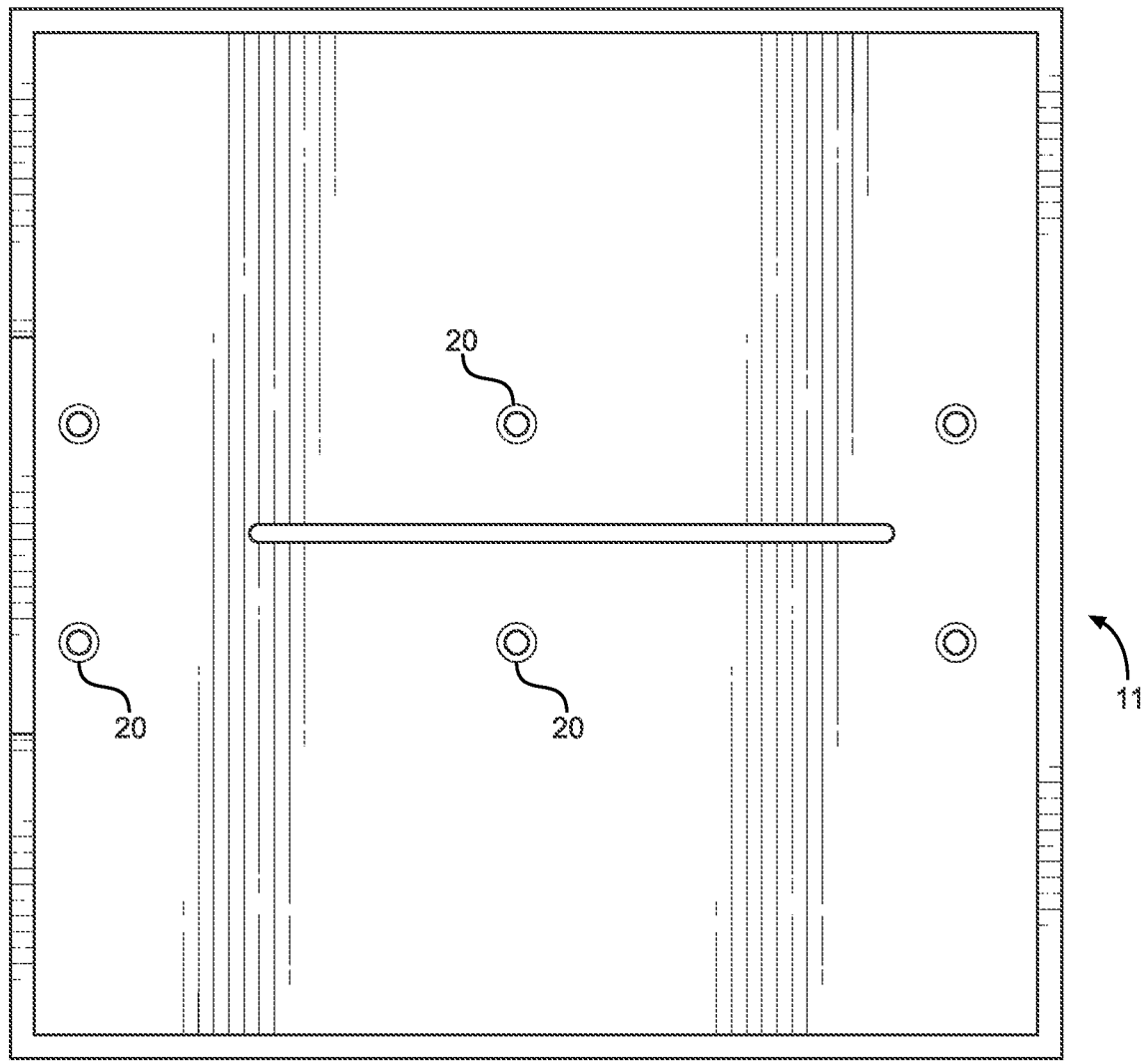
FIG. 4 depicts a bottom view of certain embodiments of the mounting apparatus, illustrating the support assembly.
Figure 9:
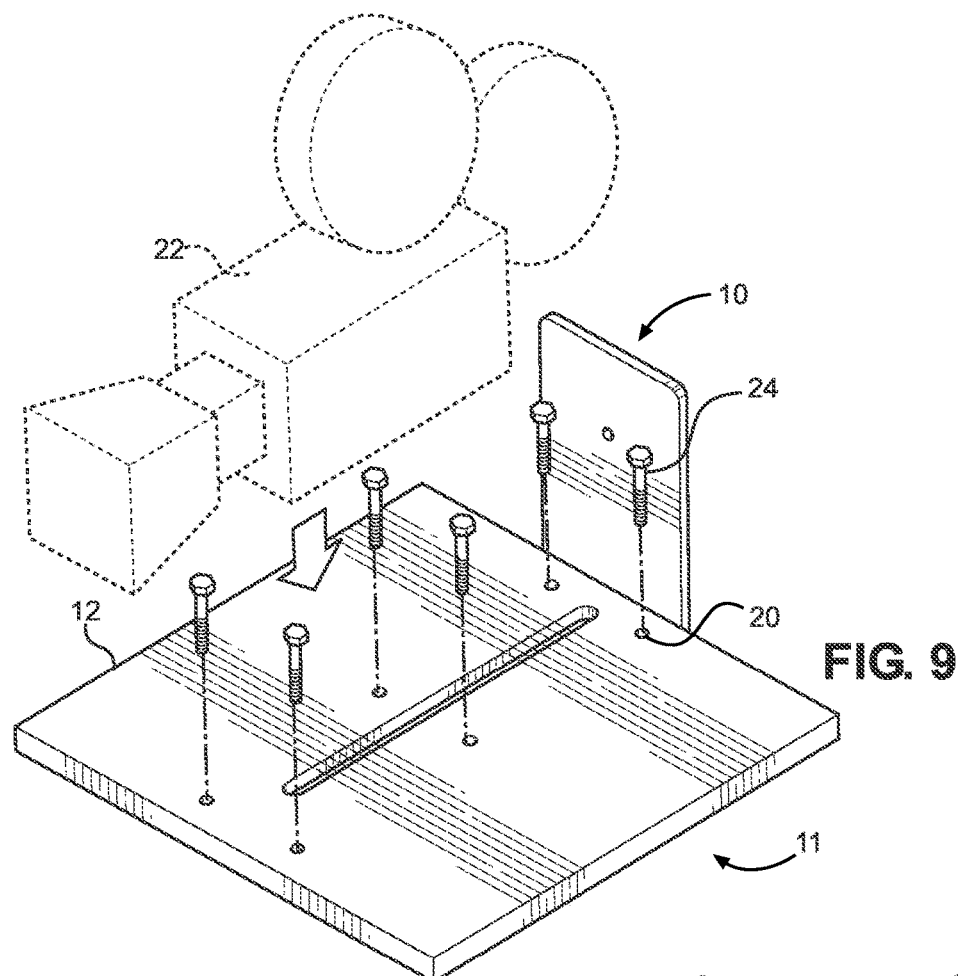
FIG. 9 depicts a top perspective view of certain embodiments of the mounting apparatus shown in use.

In certain embodiments as depicted in FIGS. 1-2 and 9, the mounting apparatus generally comprises L-shaped bracket 10 and support assembly 11, and is configured to secure camera 22 to a crane (not shown). The mounting apparatus provides a stable platform on the crane to allow camera 22 to capture images and/or video for a variety of applications including, but not limited to, television or movie productions or other professional works. It shall be appreciated that different cranes known in the field can be used in embodiments of the invention. Camera 22 can be any type of video camera known in the field.

In one embodiment as depicted in FIGS. 1, 3, 5 and 7, L-shaped bracket 10 comprises horizontal plate 26 continuously connected to vertical plate 28. In one embodiment, horizontal plate 26 of L-shaped bracket 10 comprises approximate dimensions of an 8" width×23.6" length×0.50" thickness, and comprises elongated slot 14 and a plurality of lower plate openings 18. In one embodiment, elongated slot 14 is disposed entirely through a central portion of horizontal plate 26 and comprises approximate dimensions of a 12" length×0.625" width. In one embodiment, six lower plate openings 18 are disposed through horizontal plate 26. However, it shall be appreciated that the number and location of lower plate openings 18 on horizontal plate 26 can vary in alternative embodiments.

In one embodiment, vertical plate 28 of L-shaped bracket 10 comprises approximate dimensions of an 8" width×12" length×0.50" thickness, and comprises upper plate opening 19. Upper plate opening 19 is configured to receive a mechanical fastener that secures L-shaped bracket 10 to the end of the crane. In an alternative embodiment, vertical plate 28 may comprise any number of upper plate openings 19 and/or slots for receiving additional fasteners to secure L-shaped bracket 10 to the crane. In one embodiment, vertical plate 28 of L-shaped bracket 10 can be coupled to various locations on the crane.

In certain embodiments, L-shaped bracket 10 is made from aluminum, steel, other metals or materials. It shall be appreciated that the dimensions of L-shaped bracket 10 including the length, width and thickness of horizontal and vertical plates 26, 28, the size and location of upper and lower plate openings 19, 18, and size and location of elongated slot 14 on horizontal plate 26 can vary in alternative embodiments. In one embodiment, the width of horizontal and vertical plates 26, 28 is 12" or greater.

In one embodiment as depicted in FIGS. 2, 4, 6 and 8, support assembly 11 comprises main plate 15 and side wall 12. In one embodiment, main plate 15 of support assembly 11 comprises approximate dimensions of a 24" length×24" width×0.50" thickness. In an alternative embodiment, main plate 15 comprises approximate dimensions of a 42" length× 42" width×0.50" thickness.

In one embodiment, main plate 15 comprises elongated slot 16 and a plurality of main plate openings 20. Elongated slot 16 is disposed entirely through a central portion of main plate 15 and comprises approximate dimensions of a 12" length×0.375" width. In one embodiment, six main plate openings 20 are disposed through main plate 15 to correspond to and align with lower plate openings 18 in L-shaped bracket 10. However, it shall be appreciated that the number and location of main plate openings 20 on main plate 15 can vary to match the number and location of lower plate openings 18 in L-shaped bracket 10.

In one embodiment as depicted in FIGS. 2, 6 and 8, side wall 12 is welded to the bottom face of main plate 15 and extends along the periphery of main plate 15. In an alternative embodiment, side wall 12 can be coupled to main plate 15 using alternative fasteners. In one embodiment, side wall 12 comprises approximate dimensions of a 1¼" height×0.50" thickness along the periphery of main plate 15. In one embodiment as depicted in FIG. 2, side wall 12 comprises cutout 13, which comprises dimensions sufficiently large to permit horizontal plate 26 of L-shaped bracket 10 to extend through cutout 13 and along the bottom face of main plate 15.

In certain embodiments, support assembly 11 is made from aluminum, steel, other metals or materials. It shall be appreciated that the dimensions of main plate 15 and side wall 12 can vary. The size and location of main plate openings 20 and elongated slot 16 on main plate 15 can vary in alternative embodiments.

Figure 10:
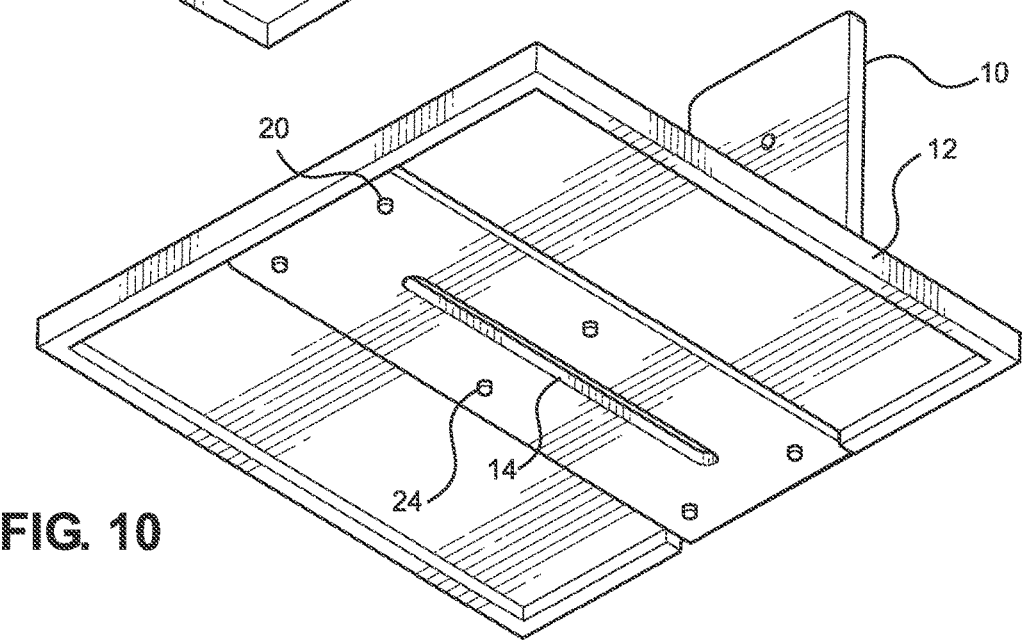
FIG. 10 depicts a bottom perspective view of certain embodiments of the mounting apparatus.

In operation, the mounting apparatus is used to secure camera 22 to the crane using the following exemplary steps in one embodiment of the invention. In one embodiment as depicted in FIGS. 9-10, main plate 15 of support assembly 11 is disposed on horizontal plate 26 of L-shaped bracket 10. To minimize lateral movement of L-shaped bracket 10 relative to support assembly 11, horizontal plate 26 of L-shaped bracket 10 extends through cutout 13 in side wall 12 of support assembly 11 and along the bottom face of main plate 15. In this position, elongated slot 16 of support assembly 11 aligns with elongated slot 14 of L-shaped bracket 10.

In one embodiment, a plurality of mechanical fasteners 24 such as tapered bolts are inserted through main plate openings 20 in main plate 15 and lower plate openings 18 in horizontal plate 26 to securely fasten support assembly 11 to L-shaped bracket 10. It shall be appreciated that any number of mechanical fasteners 24 can be used to secure support assembly 11 to L-shaped bracket 10 depending on the number of main plate openings 20 in main plate 15 and lower plate openings 18 in horizontal plate 26 present. A fastener such as a bolt or other mechanical fastener is inserted through upper plate opening 19 in L-shaped bracket 10 to couple the mounting apparatus to the end of the crane or alternative location of the crane.

In one embodiment as depicted in FIG. 9, camera 22 is disposed on the top surface of main plate 15 of support assembly 11. A fastener such as a bolt is inserted through elongated slot 14 of L-shaped bracket 10 and elongated slot 16 of support assembly 11 to directly engage camera 22 or any other secondary mounting device coupled to camera 22. The larger width of elongated slot 14 in L-shaped bracket 10 compared to the width of elongated slot 16 in support assembly 11 allows the bolt head to sit within elongated slot 14 when the bolt engages camera 22.

In this configuration, the mounting apparatus couples camera 22 to the crane. The crane is operated and/or maneuvered as needed to allow camera 22 to capture the desired images and/or video during a television or movie production. In one embodiment, the mounting apparatus is configured to have a load-bearing capacity of approximately 200 lb. However, it shall be appreciated that the components of the mounting apparatus can be modified to achieve different load-bearing capacities as desired.

In an alternative embodiment, multiple L-shaped brackets 10 can be stacked together to align lower plate openings 18 and elongated slots 14 in the L-shaped brackets 10 together. In this embodiment, the L-shaped brackets 10 are coupled to support assembly 11 in the same manner as previously described using mechanical fasteners 24. Alternatively, the multiple L-shaped brackets 10 can be stacked and welded together. The mounting apparatus in this embodiment is used in the same manner as previously described in embodiments of the invention to secure camera 22 to the crane. The use of multiple L-shaped brackets 10 stacked together enhances support of the camera on the mounting apparatus.

It shall be appreciated that the components of the mounting apparatus described in several embodiments herein may comprise any alternative known materials in the field and be of any color, size and/or dimensions. It shall be appreciated that the components of the mounting apparatus described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A mounting apparatus for use to secure a camera to an end of a crane with enhanced load-bearing capacity and stability, the mounting apparatus comprising:
    a L-shaped bracket comprising a horizontal plate continuously connected to a vertical plate, the vertical plate configured to couple to the end of the crane, the horizontal plate comprising an elongated slot disposed therethrough; and
    a support assembly comprising a main plate disposed on the horizontal plate of the L-shaped bracket, the main plate of the support assembly comprising an elongated slot that aligns with the elongated slot in the horizontal plate of the L-shaped bracket;
    wherein the main plate is configured to support the camera thereon and the elongated slots in the horizontal plate of the L-shaped bracket and main plate of the support assembly are configured to receive a fastener that extends through the elongated slots to engage the camera, thereby securing the camera to the end of the crane.

2. The mounting apparatus of claim 1, wherein the support assembly further comprises a side wall coupled to a bottom face of the main plate that extends along a periphery of the main plate.

3. The mounting apparatus of claim 2, wherein the side wall in the support assembly comprises a cutout that allows the horizontal plate of the L-shaped bracket to extend through the cutout in the side wall and along the bottom face of the main plate.

4. The mounting apparatus of claim 3, wherein the horizontal plate of the L-shaped bracket is directly coupled to the main plate of the support assembly.

5. The mounting apparatus of claim 4, further comprising a first set of openings disposed through the horizontal plate of the L-shaped bracket and a second set of openings disposed through the main plate of the support assembly, the first set of openings in the horizontal plate aligned with the second set of openings in the main plate.

6. The mounting apparatus of claim 5, further comprising a plurality of mechanical fasteners extending through the first and second sets of openings to couple the horizontal plate of the L-shaped bracket to the main plate of the support assembly.

7. The mounting apparatus of claim 5, wherein the elongated slot in the horizontal plate of the L-shaped bracket comprises a first width and the elongated slot in the main plate of the support assembly comprises a second width, wherein the first width is greater than the second width.

8. A method for securing a camera to an end of a crane, the method comprising:
 providing a mounting apparatus, the mounting apparatus comprising:
  a L-shaped bracket comprising a horizontal plate continuously connected to a vertical plate, the horizontal plate comprising an elongated slot disposed therethrough; and
  a support assembly comprising a main plate having an elongated slot and a side wall coupled to a bottom face of the main plate and extending along a periphery of the main plate, the side wall comprising a cutout;
 securing the vertical plate of the L-shaped bracket to the end of the crane;
 disposing the main plate of the support assembly on the horizontal plate of the L-shaped bracket to enable the horizontal plate to extend through the cutout in the side wall of the support assembly and along the bottom face of the main plate;
 disposing the camera on the main plate of the support assembly; and
 inserting a fastener through the elongated slots in the horizontal plate of the L-shaped bracket and main plate of the support assembly to engage the camera.

9. The method of claim 8, further comprising aligning the elongated slot in the horizontal plate of the L-shaped bracket with the elongated slot in the main plate of the support assembly.

10. The method of claim 9, further comprising inserting a plurality of mechanical fasteners through the horizontal plate of the L-shaped bracket and main plate of the support assembly to secure the L-shaped bracket to the support assembly.

* * * * *